April 23, 1929.  C. MASON ET AL  1,710,233
MEASURING DISPENSER
Filed July 6, 1926

Inventors
Collins Mason
Alfred W. Bond

Attorney

Patented Apr. 23, 1929.

1,710,233

UNITED STATES PATENT OFFICE.

COLLINS MASON, OF LOS ANGELES, CALIFORNIA, AND ALFRED W. BOND, OF NEW YORK, N. Y.

MEASURING DISPENSER.

Application filed July 6, 1926. Serial No. 120,564.

Our invention relates to improvements in measuring dispensers of the type particularly suitable to pulverized and such materials, and, as will be seen from the following detailed description of one preferred embodiment of our invention, it embodies features which render it commercially practicable from the standpoint of manufacture.

Many materials such as are dispensed from such devices often become sticky or gummy, either in the container or in the dispensing recess, resulting in clogging. This has been one of the chief shortcomings of devices of the prior art. The disturbing and agitating means which we have provided completely overcomes this trouble and renders our device absolutely "fool-proof" even under most unfavorable conditions.

A detailed description of one specific adaptation of our invention will better illustrate these improvements and for purposes of illustration we shall choose such a dispenser as one for dispensing tooth powder or the like, although by going into such detail and using one specific embodiment of our invention we do not wish thereby to limit its scope to such details. Therefore in the accompanying drawings we illustrate a tooth powder dispenser embodying our invention, and in these drawings.

Figure 2:
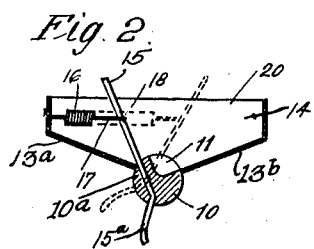
Fig. 2 is a cross-sectional view showing the agitating means, the dispenser being in closed position.
Figure 3:
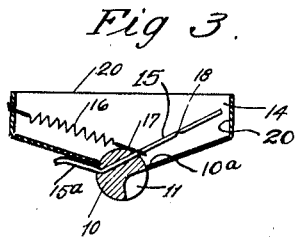
Fig. 3 is a similar view showing the dispenser in open, or ejecting, position.
Figure 4:
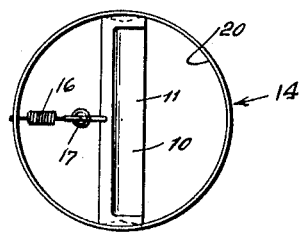
Fig. 4 is a bottom view of the dispenser in closed, or material receiving, position.
Figure 5:
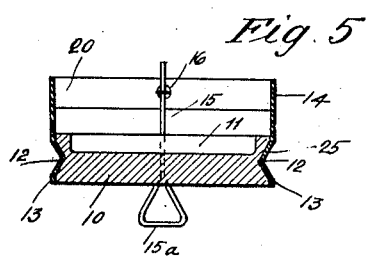
Fig. 5 is a cross-sectional view of the material carrier.

Carrier 10, which is preferably, though not necessarily, cylindrical, has a recess or pocket 11 for receiving a measured charge of material from the inside of a container A when the carrier is in the position of Fig. 2 and for discharging it on the outside upon rotation of the carrier in a clockwise direction to its discharging position as shown in Fig. 3. The ends of carrier 10 are indented conically as at 12 (shown best in Fig. 5), the points of these indentations being co-axial.

Carrier 10, which may be made of any suitable material, is rotatably mounted between the two upright members 13, which members form a part of or may be affixed to dispenser base or supporting cap 14. The uprights are conically indented as at 25, fitting into the complementary indentation or sockets 12 to form bearings whereby the carrier 10 is mounted for axial rotation. However the fit of the complementary indentations is such as will frictionally hold the carrier against undue movement. Carrier 10 is mounted in and forms a movable closure for the mouth 10ª, defined by the lower edges of downwardly and inwardly inclining face plates 13ª and 13ᵇ, plate 13ᵇ leading directly to recess or pocket 11.

Carrier or closure 10 carries a rod 15, which may be made of any material of suitable strength, as stiff wire. This rod may extend through the carrier, it being desirable, however, that the rod should not pass through the recess in the carrier. This rod extends from the side of the carrier into the container preferably to an extent sufficient to enable it to disturb the contents of the container when the rod is moved upon rotation of the carrier. Carrier 10 carries a handle 15ª for manipulating it into open, or ejecting, position. This handle may either be made integrally with the carrier, may be affixed thereto, or as is preferred, it may be formed by rod 15 extending through the carrier and emerging on the opposite side and being bent or otherwise made so as to form a handle or manipulating means.

Figure 6:
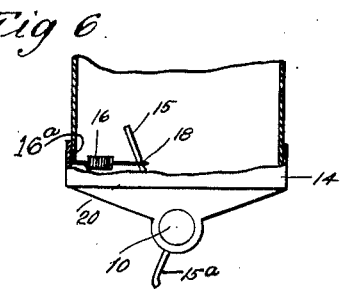
Fig. 6 is a side view showing the position of the actuating spring when the dispenser is closed.

For automatically closing the carrier we provide a spring 16, preferably an extension spring of suitable strength. One end of spring 16 may be anchored to or looped through the dispenser base itself. Those skilled in the art will readily understand how this end of the spring 16 may be anchored in various ways. In this particular adaptation of our invention we have found that it aids economy of assembly merely to hook one end 16ª of spring 16 over the container rim before the dispenser mounting is placed thereon (see Fig. 6). The other end of spring 16 is formed into a loop 17 slidable on rod 15. The position of spring 16 is shown in the closed and open positions of the dispenser in Figs. 2 and 3, respectively. When in closed position loop 17 of spring 16 rests in a notch or U-shaped bend 18 in rod 15. The spring yields upon clockwise rotation of carrier 10 to its open, or ejecting, position, and approximately simultaneously with carrier 10 reaching its ejecting position the spring is stretched in such a manner that loop 17 of spring 16 slips from notch 18 and, sliding along rod 15, strikes carrier 10 sharply, thereby functioning as an impacting member, jarring the carrier and causing the contents of recess 11 to drop out smoothly and completely, even though the material may be sticky or gummy. The notch or U-shaped bend 18 may not always be necessary; its function is merely to limit the sliding of the spring in one direction on rod 15 and to cause the spring to be released suddenly but with delayed action as regards the initial rotational movement of the carrier. However, rod 15 may be made long enough that the spring cannot slide off over its end; and when rod 15 reaches a position such that the spring will slide toward the position of Fig. 3 the spring will always move quickly. Thus spring 16 and rod 15 serve as means for automatically closing the dispenser and also as an agitator to insure the ejection of materials even though they may have a tendency to stick; also rod 15, when extended into the container to a sufficient depth, serves to stir or disturb the material in the container as the carrier is moved. The base 14, which acts as the container cover as well as the mounting for carrier 10, may be constructed of any suitable material in any of the various manners well known to the art. Base 14 may be of any desired shape that will afford proper mounting for carrier 10 and in this particular adaptation we illustrate it as including annular flange 20 to fit the end of an ordinary cylindrical powder container.

Figure 1:
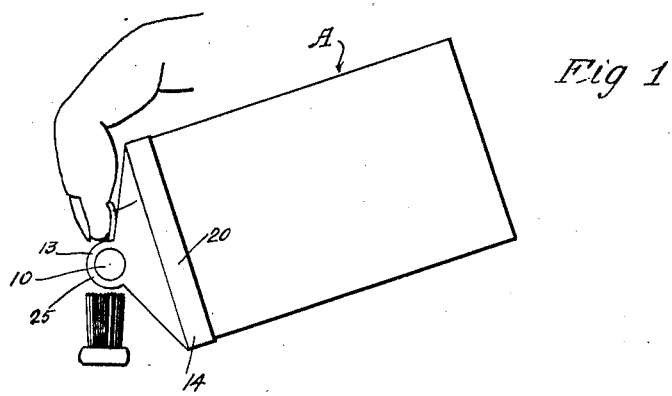
Fig. 1 is a side elevation of our dispensing device attached to an ordinary tooth powder container.

Having thus described the function and construction of the various elements of this particular adaptation of our invention, it may further aid a clear understanding to describe a typical operation:

First the device is tilted to an angle (Fig. 1) which permits the contents of the container to fill recess 11 of carrier 10. Carrier 10 is then rotated clockwise by means of handle 15ª until its ejecting position (Fig. 3) is reached, handle 15ª engaging base plate 13ª to limit clockwise movement of the carrier. Substantially simultaneously with carrier 10 reaching this position, loop 17 of spring 16 slips from notch 18, slides along rod 15 and hits and jars carrier 10 (Fig. 3) causing the contents of recess 11 to drop out evenly. The contents of recess 11 having thus been ejected, the device is lifted clear of the ejected quantity, manual pressure on handle 15ª is relieved, and the spring 16 acts on rod 15 to return carrier 10 automatically to closed (or material receiving) position, the loop 17 sliding back along rod 15 and finally dropping into notch 18. The speed with which carrier 10 is closed may be controlled by manipulation of handle 15ª. Return movement of the carrier is limited by the engagement of rod 15 with plate 13ª. It will be seen that angular movement of the carrier in opposite directions is thus limited by alternate engagement of rod 15 and handle 15ª with plate 13ª, which plate may thus be considered as a stop.

From this detailed description and illustration of one preferred embodiment, the invention itself, in its broader aspects, will be clear to those skilled in the art.

We claim:

1. A device for delivering material from a container, embodying a carrier mounted on the container for movement from a position where it is adapted to receive material from within the container to a position where it is adapted to deliver the received material without the container, and means associated with the carrier and acting on the carrier to impart a jarring blow to said carrier approximately when it reaches delivery position and subsequently acting to move the carrier back towards material receiving position.

2. In a device of the character described, a container having a delivery mouth, a pocketed closure for the mouth, said closure being mounted on the container for movement to carry said pocket through said mouth from inside to outside of the container, and means associated with the closure for imparting a jarring blow to the closure when it is moved to a position when said pocket is outside the container.

3. A device for delivering material from a container, embodying a carrier mounted on the container for rotation from a position where it is adapted to receive material from within the container to a position where it is adapted to deliver the received material without the container, a member projecting inwardly from the carrier, a spring having a portion releasably applied to said member at a point spaced from the carrier in a manner yieldingly to hold the carrier in material receiving position and, when released, movable longitudinally along said member from said point into contact with the carrier to impart a jarring blow to the carrier when it reaches a predetermined position in its movement from its receiving position towards its delivery position.

4. A device for delivering material from a container, embodying a carrier mounted on the container for rotation from a position where it is adapted to receive material from within the container to a position where it is adapted to deliver the received material without the container, a rod projecting inwardly from the carrier, an extension spring applied at one end to the rod in a manner yieldingly to hold the carrier normally in material-receiving position, said one end of the spring being movable between limits longitudinally along the rod during a portion of the rotational movement of the carrier and being adapted to reach one limit approximately as the carrier reaches delivery position, thereby to effect a jarring of the carrier.

5. A device for delivering material from a container, embodying a carrier mounted on the container for rotation from a position where it is adapted to receive material from within the container to a position where it is adapted to deliver the received material without the container, a rod projecting inwardly from the carrier, an extension spring applied at one end to the rod in a manner yieldingly to hold the carrier normally in material-receiving position, said one end of the spring being movable between limits longitudinally along the rod during a portion of the rotational movement of the carrier, means adapted to hold said one spring end against such movement along the rod during the initial rotation of the carrier towards delivery position and to release the end for such movement approximately when the carrier reaches its delivery position.

In witness that we claim the foregoing, we have hereunto subscribed our names this 1st day of June, 1926.

COLLINS MASON.
ALFRED W. BOND.